United States Patent
Rousselot

(10) Patent No.: US 11,004,016 B2
(45) Date of Patent: May 11, 2021

(54) QUERY-BASED IDENTIFIERS FOR CROSS-SESSION RESPONSE TRACKING

(71) Applicant: Amadeus S.A.S., Biot (FR)

(72) Inventor: Xavier Rousselot, Grasse (FR)

(73) Assignee: AMADEUS S.A.S., Biot (FR)

( * ) Notice: Subject to any disclaimer, the term of this patent is extended or adjusted under 35 U.S.C. 154(b) by 675 days.

(21) Appl. No.: 15/695,274

(22) Filed: Sep. 5, 2017

(65) Prior Publication Data
US 2019/0073610 A1 Mar. 7, 2019

(51) Int. Cl.
| | | |
|---|---|---|
| G06Q 10/02 | (2012.01) | |
| G06F 16/248 | (2019.01) | |
| G06F 16/9537 | (2019.01) | |
| G06Q 50/14 | (2012.01) | |
| G06F 16/22 | (2019.01) | |

(52) U.S. Cl.
CPC ......... *G06Q 10/02* (2013.01); *G06F 16/2255* (2019.01); *G06F 16/248* (2019.01); *G06F 16/9537* (2019.01); *G06Q 50/14* (2013.01)

(58) Field of Classification Search
CPC .... G06Q 10/02; G06Q 50/14; G06F 16/2255; G06F 16/9537; G06F 16/248; G06F 17/60; G06F 17/30; G06N 5/02
USPC ...................... 705/5, 1; 707/721; 706/14, 47
See application file for complete search history.

(56) References Cited

U.S. PATENT DOCUMENTS

| | | |
|---|---|---|
| 6,466,931 B1 | 10/2002 | Attaluri et al. |
| 8,996,497 B2 | 3/2015 | Agarwal et al. |
| 9,032,282 B2 | 5/2015 | Kummer |
| 9,077,780 B2 | 7/2015 | Dixon et al. |
| 10,198,527 B2 * | 2/2019 | Goldstein ............. G06F 16/957 |
| 2004/0249682 A1 * | 12/2004 | DeMarcken ........... G06Q 10/02 705/5 |
| 2007/0192168 A1 * | 8/2007 | Van Luchene ........ G06F 16/951 705/14.54 |
| 2008/0162699 A1 * | 7/2008 | Gaffney .................. H04L 67/02 709/226 |

(Continued)

FOREIGN PATENT DOCUMENTS

| | | | |
|---|---|---|---|
| CN | 105740304 A | 7/2016 | |
| WO | WO-2016109102 A1 * | 7/2016 | ............. G06F 40/58 |
| WO | 2017035306 A1 | 3/2017 | |

OTHER PUBLICATIONS

Bennett, Drake. "Expedia Relentlessly Tests the Science of User Experience and Vacation Planning". Published Feb. 25, 2016. https://skift.com/2016/02/25/expedia-relentlessly-tests-the-science-of-user-experience-and-vacation-planning/ (Year: 2016).*

(Continued)

*Primary Examiner* — George Chen
*Assistant Examiner* — Lisa Ma
(74) *Attorney, Agent, or Firm* — Thompson Hine LLP

(57) ABSTRACT

Systems and methods for cross-session response tracking in a distributed computing environment using query identifiers generated based on search parameters. A search query including search parameters is received from a client device. A query identifier for the search query is generated based on the search parameters. One version of a search result among multiple versions of the search result is selected based on the query identifier and sent to the client device. A record in a transaction database is correlated with the selected version of the search result using the query identifier.

21 Claims, 8 Drawing Sheets

(56) References Cited

U.S. PATENT DOCUMENTS

| | | | |
|---|---|---|---|
| 2010/0049678 A1 | 2/2010 | Huang et al. | |
| 2011/0184936 A1* | 7/2011 | Lymberopoulos | G06F 16/9574 707/721 |
| 2012/0022938 A1* | 1/2012 | McNea | G06Q 30/016 705/14.42 |
| 2012/0185793 A1 | 7/2012 | Binsztok | |
| 2012/0203578 A1 | 8/2012 | Baggett et al. | |
| 2013/0282510 A1 | 10/2013 | Swamy et al. | |
| 2013/0290480 A1* | 10/2013 | Manion | G06F 40/143 709/217 |
| 2013/0346264 A1* | 12/2013 | Falkenborg | G06Q 40/10 705/30 |
| 2014/0019176 A1* | 1/2014 | Mandelbaum | G06Q 10/025 705/6 |
| 2014/0310691 A1 | 10/2014 | Ou | |
| 2015/0058308 A1 | 2/2015 | Zheng | |
| 2015/0363302 A1 | 12/2015 | Young | |
| 2016/0124839 A1 | 5/2016 | Mordo et al. | |
| 2016/0140028 A1 | 5/2016 | Woodward | |
| 2017/0048338 A1 | 2/2017 | Wen | |
| 2017/0104683 A1 | 4/2017 | Parthasarathy | |

OTHER PUBLICATIONS

European Patent Office, Search Report issued in Application No. 18189278.7 dated Oct. 11, 2018.

Hendaryanto, "Memcached and PHP, Caching Mysql Query Result", kutukupret.com, May 4, 2011, retrieved from the internet at <https://www.kutukupret.com/2011/05/04/memcached-and-php-caching-mysql-query-result/>.

National Institute of Industrial Property, Preliminary Search Report issued in French Patent Application No. 1758155 dated Mar. 12, 2018.

Watanabe et al., "Poster: Automated A/B Testing with Declarative Variability Expressions", 10th IEEE International Conference on Software Testing, Verification and Validation Workshops, Mar. 13-17, 2017.

Iitsuka et al., "Website Optimization Problem and Its Solutions", Proceedings of the 21th ACM SIGKDD International Conference on Knowledge Discovery and Data Mining, pp. 447-456, Sydney, NSW, Australia, Aug. 10-13, 2015.

European Patent Office, Official Action issued in Application No. 18 189 278.7 dated Oct. 2, 2019.

* cited by examiner

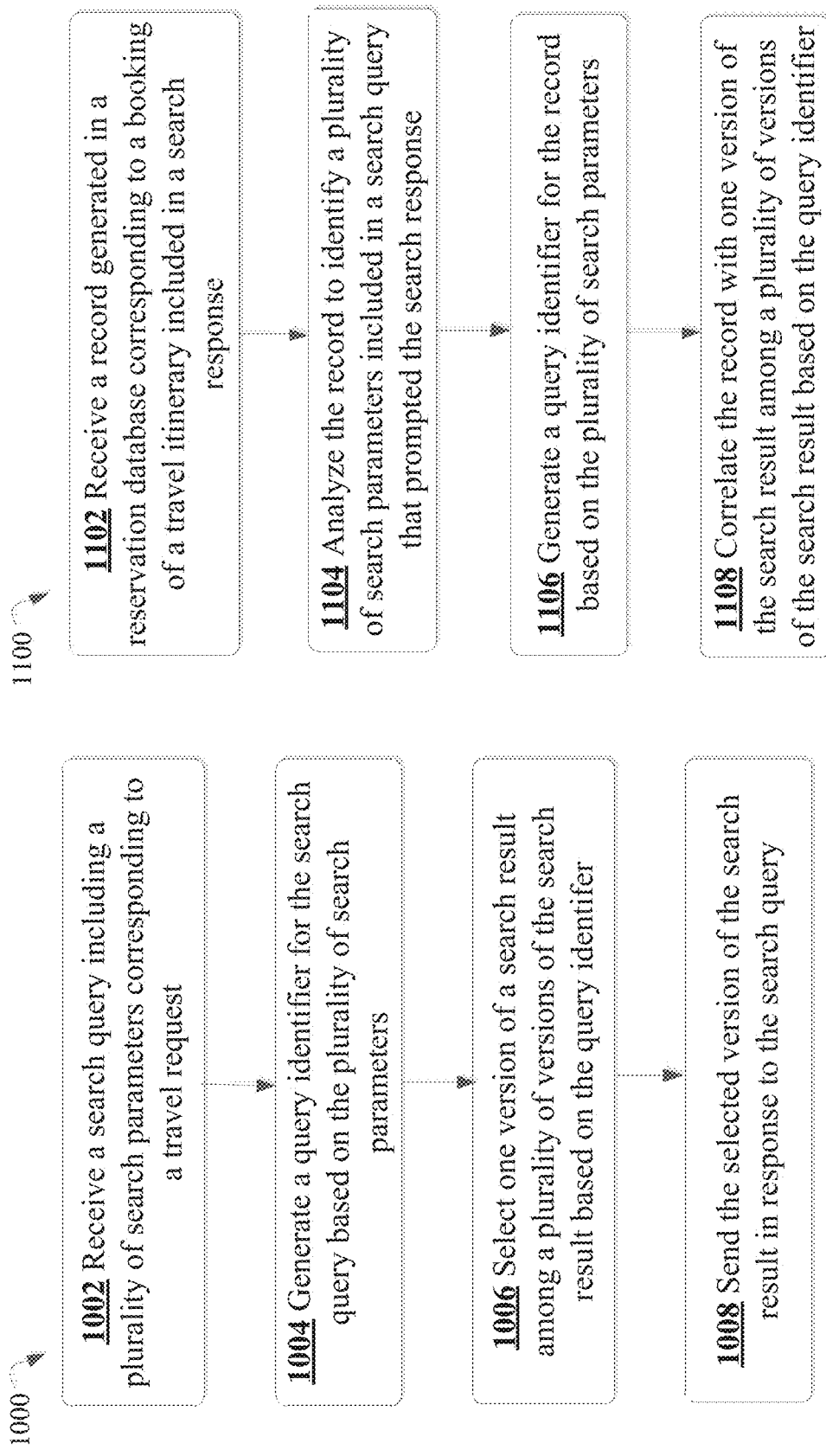

QUERY-BASED IDENTIFIERS FOR CROSS-SESSION RESPONSE TRACKING

TECHNICAL FIELD

The present invention relates generally to a distributed computing environment, although not limited thereto. More specifically, the present invention relates to techniques for client-agnostic partitioning of search queries using search parameter-based query identifiers and cross-session response tracking in a distributed computing environment.

BACKGROUND

Controlled experiments, such as A|B testing, enable updates to current systems or new features to be objectively evaluated while minimizing the risks associated with full deployment. In A|B testing, for example, an update or a new feature of a system being tested (hereinafter "version B") may be objectively evaluated against a current version (hereinafter "version A"). Users interacting with the system under test may be partitioned such that a first subset of the users are presented with version A while a second subset of the users are presented with version B. Evaluation metrics may be determined for each version using data collected regarding responses or behaviors of users in the first and second subsets. Such evaluation metrics facilitate objectively evaluating version B against version A.

Obtaining valid results from these controlled experiments may involve two distinct requirements. First, a technique may be required for partitioning users interacting with a system being tested that is independent of tested system behavior to realize unbiased assignment to version A or version B. Second, a technique of correlating those partitions with subsequent responses or outcomes may be required to obtain data for generating evaluation metrics. These distinct requirements may be difficult to satisfy when implementing controlled experiments in distributed computing environments.

Conventional techniques for implementing controlled experiments in distributed computing environments utilize client-side identifiers to partition users and correlate those partitions with subsequent responses. In using client-side identifiers, conventional techniques depend on users to maintain an unbiased assignment to partitions or to correlate those assigned partitions with subsequent results or outcomes. For example, some conventional techniques use data (known as "cookies") persistently stored on client devices by a web server interacting with web-browsers executing on the client devices to assign users to a particular test partition. Under this cookie-based approach, a user that is initially assigned to version A of a controlled experiment may subsequently be assigned to version B by merely clearing the cookies stored on a client device of the user. By clearing the cookies stored on the client device, the user is introducing bias into the assignment of partitions.

As another example, some conventional techniques use session identifiers assigned by web servers to client devices (or applications) upon establishing client-server sessions with the client devices. However, session identifiers are generally based on specific parameters associated with the client devices, such as a network address of a client device, a machine address associated with a client device, a descriptor of a particular application executing on a client device, and the like. As such, this session-based approach is inherently client/session-specific. For example, a user may be assigned to a partition during a first session. That user may initiate a new (second) session with a web-server using a different client device, a different network connection, or even a different application executing on the same client device during a transaction. By initiating the second session, the user may have frustrated the ability to correlate the partition assigned during the first session with the subsequent response or outcome of the second session.

SUMMARY

Embodiments of the present invention provide systems, methods, and computer-readable storage media for client-agnostic partitioning of search queries using search parameter-based query identifiers and cross-session response tracking in a distributed computing environment. In an embodiment, a system includes a computing device and a computer-readable storage medium that includes a first set of instructions. Upon execution by the computing device, the first set of instructions cause the system to receive a search query corresponding to a travel request for a customer from a client device at a reservation system. The search query includes a plurality of search parameters determined locally at the client device using input data received via an interface on the client device. A query identifier is generated by the reservation system based on the plurality of search parameters. One version of a search result that includes a travel itinerary that satisfies the plurality of search parameters among a plurality of versions of the search result is selected based on the query identifier. Each version of the search result among the plurality of versions of the search result is distinct from the other versions by virtue of a variant. The selected version of the search result is sent to the client device thereby updating the interface on the client device.

In another embodiment, a method includes receiving a search query corresponding to a travel request for a customer from a client device at a reservation system. The search query includes a plurality of search parameters determined locally at the client device using input data received via an interface on the client device. The reservation system generates a query identifier for the search query based on the plurality of search parameters. A search result comprising a travel itinerary that satisfies the plurality of search parameters is determined. One version of the search result among a plurality of versions of the search result is selected based on the query identifier with each version of the search result among the plurality of versions being distinct from the other versions by virtue of a variant. The selected version of the search result is sent to the client device thereby updating the interface on the client device.

In another embodiment, a non-transitory computer-readable storage medium including computer-readable instructions is provided. Upon execution by a processor of a computing device, the computer-readable instructions cause the computing device to receive a search query corresponding to a travel request for a customer from a client device at a reservation system. The search query includes a plurality of search parameters determined locally at the client device using input data received via an interface on the client device. A query identifier is generated by the reservation system based on the plurality of search parameters. One version of a search result that includes a travel itinerary that satisfies the plurality of search parameters among a plurality of versions of the search result is selected based on the query identifier. Each version of the search result among the plurality of versions of the search result is distinct from the other versions by virtue of a variant. The selected version of the search result is sent to the client device thereby updating the interface on the client device.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The accompanying drawings, which are incorporated in and constitute a part of this specification, illustrate various embodiments of the present invention and, together with the general description of the invention given above, and the detailed description of the embodiments given below, serve to explain the embodiments of the invention. In the drawings, like reference numerals are used to indicate like parts in the various views.

FIG. 10 is a flow-chart illustrating an example of a method for client-agnostic partitioning of search queries using search parameter-based query identifiers.

FIG. 11 is a flow-chart illustrating an example of a method for cross-session response tracking in a distributed computing environment using search parameter-based query identifiers.

DETAILED DESCRIPTION

Figure 1:
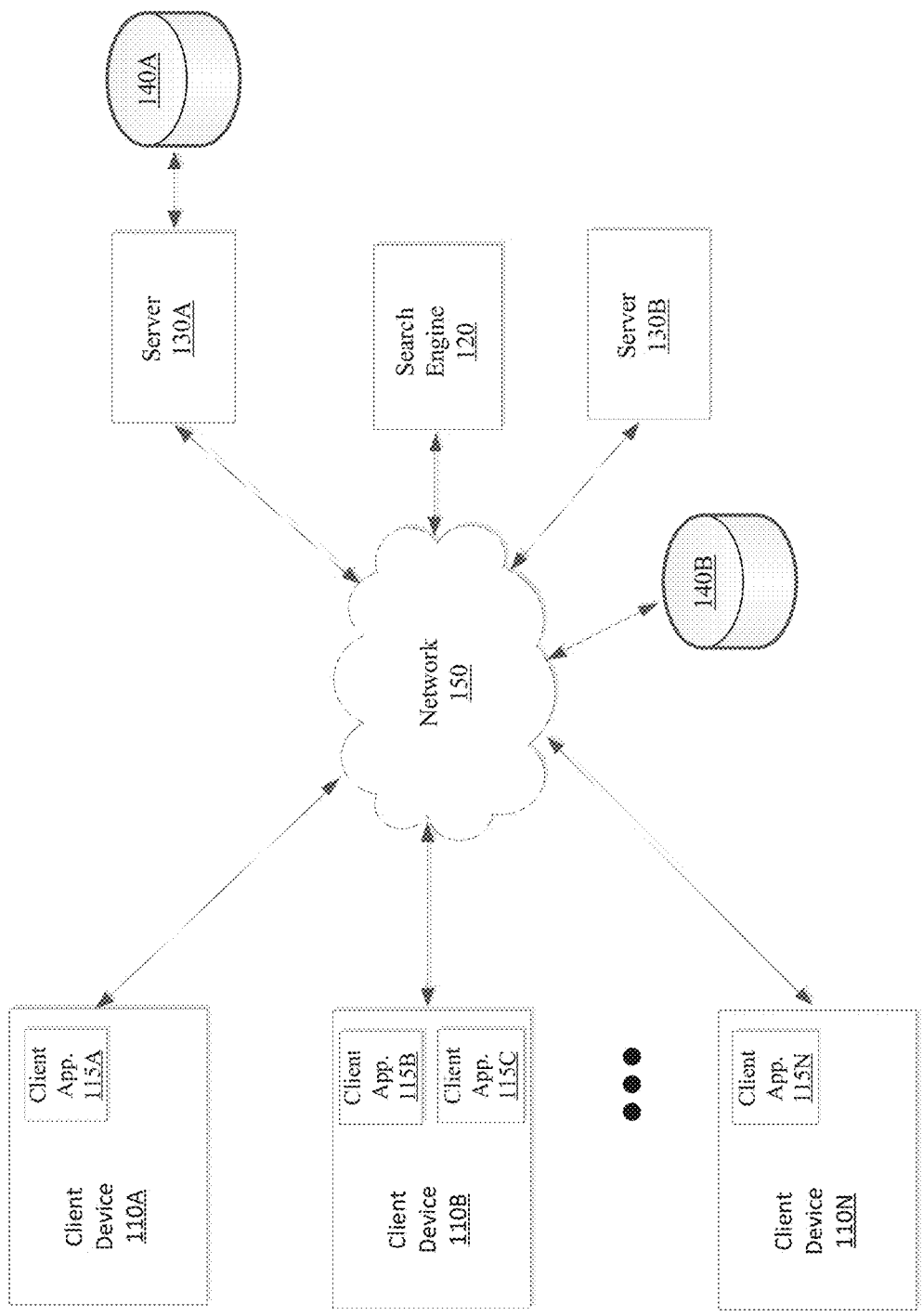
FIG. 1 is a block diagram of an example distributed computing environment that is suitable for implementing aspects of the present invention.

FIG. 1 depicts an example distributed computing environment that is suitable for implementing aspects of the present invention and that is generally referenced as operating environment 100. Operating environment 100 includes a plurality of client devices, such as client devices 110A through 110N. By way of example and not limitation, a client device may be embodied as a desktop computer, a laptop computer, a mobile computing device, a smartphone, a tablet computer, a smart watch, a consumer electronic device, a workstation, and the like. In an embodiment, each client device among the plurality of client devices may be implemented as a computing system described below with respect to FIG. 12.

A user, in operating environment 100, interacts with client applications executing on the client devices, such as client applications 115A through 115N, to access resources provided by a distributed computing system via network 150. In the example depicted in FIG. 1, the distributed computing system is composed of a plurality of components including search engine 120, server 130A, server 130B, database 140A, and database 140B.

From the perspective of the distributed computing system, the plurality of clients include particular combinations of client devices (e.g., client devices 110A and 110B through 110N) and client applications (e.g., client applications 115A, 115B, and 115C through 115N). For example, a combination of client device 110A and client application 115A is considered a first client from the perspective of the distributed computing system. As another example, a combination of client device 110B and client application 115B and a combination of client device 110B and client application 115C from the perspective of the distributed computing system are considered a second client and a third client, respectively.

In accessing resources provided by the distributed computing system, a particular client initiates a communication session with a particular component of the distributed computing network. Briefly, a communication session in example embodiments of the present disclosure refers to an information exchange flow between a server node and a client node in a client-server architecture. The information exchange flow typically involves the client node sending the server node a request that the server node processes and returns a response that satisfies the request to the client node. In an embodiment, a communication session may be implemented as a hypertext transfer protocol ("HTTP") session over a Transmission Control Protocol (TCP) connection.

Figure 2:
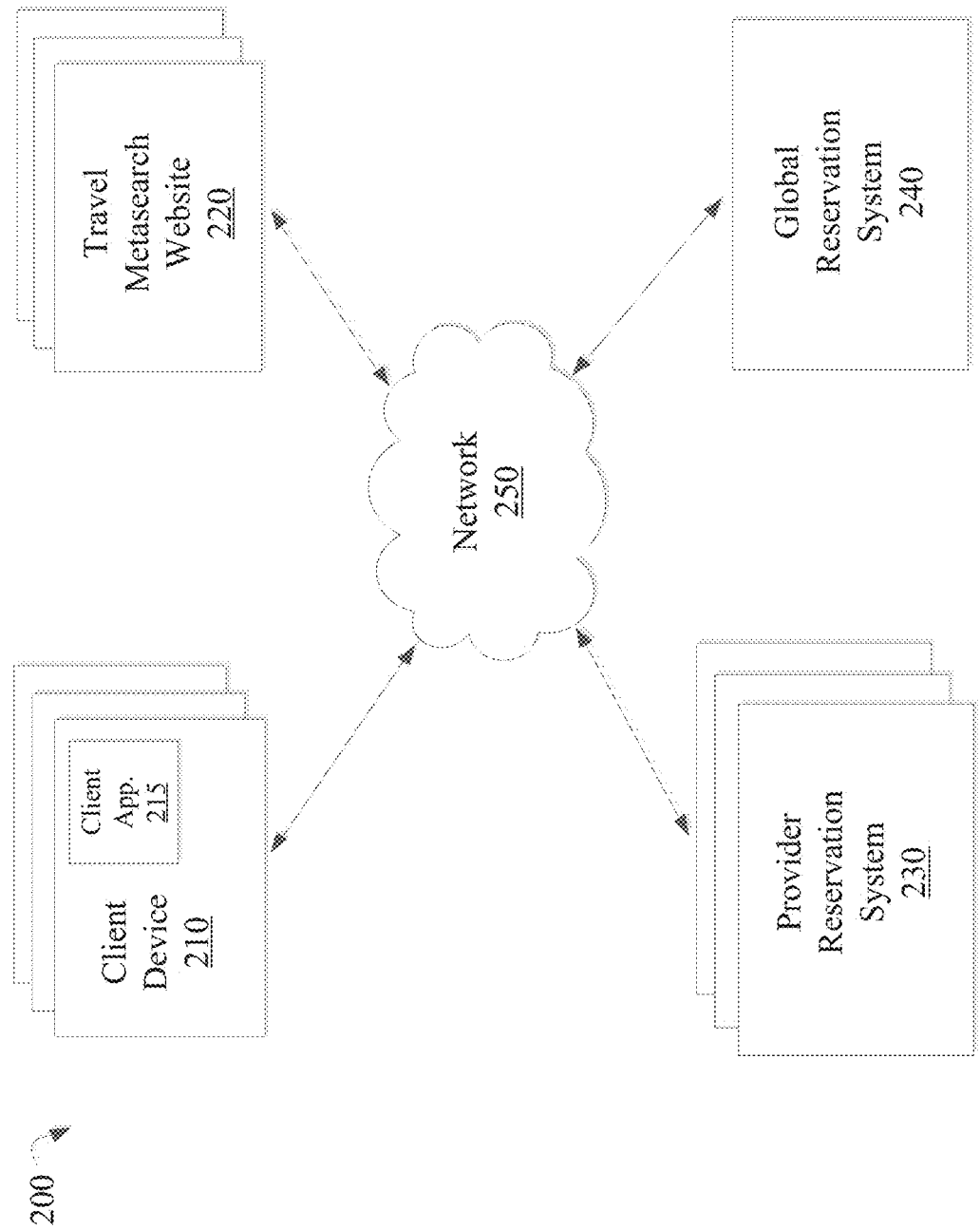
FIG. 2 is a block diagram of another example distributed computing environment that is suitable for implementing aspects of the present invention.

FIG. 2 is a block diagram depicting another example distributed computing environment that is suitable for implementing aspects of the present invention, which is generally referenced as operating environment 200. Operating environment 200 includes client device 210, travel metasearch website 220, provider reservation system 230, and global reservation system 240. In general, operating environment 200 represents the various systems involved in processing travel reservations for users (e.g., customers or passengers) in the travel industry.

In this example, the resources provided include data related to travel services ("travel-related data") and services related to booking travel services ("travel-related services"). Examples of travel-related data include travel service availability data, travel service fare data, and the like. Examples of travel-related services include reserving travel services associated with travel itineraries, ticketing reserved travel services associated with travel itineraries, and the like.

The various systems involved in processing travel reservations for customers (or passengers) in the travel industry provide one example of such distributed computing environments. In this example, a customer interested in booking travel services may submit multiple search queries during a search phase of the travel reservation process. The multiple search queries may be submitted to various sources of travel-related information using numerous combinations of client devices and application software executing in different runtime environments. As such, the customer may not always complete the travel reservation process using the same source of travel-related information or even using the same computing environment.

Even if the travel reservation process was completed in a single session between the same source of travel-related information and the same computing environment, conventional systems are unable to correlate a specific search query with a specific travel reservation. For example, in addition to the search phase, the travel reservation process also includes a booking phase and a ticketing phase involving different backend systems. Session identifiers associated with client devices are not typically propagated to servers in backend systems of conventional systems associated with the booking and ticketing phases of the travel reservation process.

The travel reservation process transitions from the search phase to the booking phase when the customer identifies a specific travel itinerary that satisfies parameters provided in the search queries during the search phase. During the booking phase, a reservation record (e.g., a passenger name record ("PNR") is created to reserve travel services associated with that travel itinerary for the customer. In creating the reservation record, a reservation system may access an inventory system hosted on the servers of a specific travel service provider or an inventory system that a global distribution system hosts for multiple travel service providers to confirm the availability of the travel services.

The travel reservation process transitions from the booking phase to the ticketing phase when the travel services that were reserved for the customer during the booking phase are purchased. During the ticketing phase, a travel document, such as a paper ticket or an electronic ticket, may be issued for each segment of the travel itinerary. Upon issuing a travel document, a ticket record corresponding to the travel document is generated in a ticketing database associated with a particular travel provider. In view of these various phases of the travel reservation process, travel metasearch website 220, provider reservation system 230, and global reservation system 240 can be viewed as a plurality of components of a distributed computing system that provide resources to a plurality of clients.

In operating environment 200, a user interacts with client device 210 during one or more phases of a travel reservation process. During a search phase of a travel reservation process, input data is received from the user via an interface associated with client application 215 effectuated by client device 210. In an embodiment, client device 210 may be implemented as any client device among client devices 110A through 110N of FIG. 1. In an embodiment, client application 215 may be implemented as any client application among client applications 115A through 115N of FIG. 1.

Client application 215 is configured to generate search queries corresponding to travel requests for a customer. Each search query includes multiple search parameters that client application 215 determines using input data received via the interface. Examples of search parameters include: an origin location, a destination location, a departure date, a return date, a number of passengers associated with a travel request ("a number in party"), a point of sale, a Reason For Issuance Sub-Code ("RFISC"), a booking class, a number of stops, a flight number, a travel provider identifier, a cabin (e.g., First Class or Economy), and the like.

Client application 215 submits the search queries to sources of travel-related data (e.g., travel metasearch website 220, provider reservation system 230, and global reservation system 240). In response to a search query, client application 215 receives a search result having at least one itinerary that satisfies the multiple search parameters included in the search query. The received search result updates the interface on client device 210 associated with client application 215.

During a reservation phase of the travel reservation process, input data is received from the user via the interface identifying an itinerary included in a search result. Client application 215 is configured to generate a reservation request for reserving the identified itinerary based on the input data. Client application 215 submits the reservation request to the system providing the search result. As described in greater detail below, if the system providing the search result is travel metasearch website 220, the reservation request is forwarded to either provider reservation system 230 or global reservation system 240 for further processing. Otherwise, the reservation request is processed by the receiving system to reserve the identified itinerary, as described below with respect to FIG. 3. Following the reservation phase is a ticketing phase in which tickets are generated for the reserved itinerary. The ticketing phase of the reservation process is also described in greater detail below with respect to FIG. 3.

Travel metasearch website 220 is configured to provide clients (e.g., client device 210) with metasearch results representing travel-related data obtained from multiple sources. Examples of systems suitable for implementing travel metasearch website 220 are operated by Priceline Group of Norwalk, Conn. and Expedia Incorporated of Bellevue, Wash. The metasearch results are generated by a metasearch engine hosted by travel metasearch website 220. The metasearch engine is configured to query multiple sources of travel-related data upon receiving search queries from a client device.

For example, travel metasearch website 220 may receive a search query including a plurality of search parameters corresponding to a travel request from client device 210. Upon receiving the search query from client device 210, travel metasearch website 220 queries provider reservation system 230 and global reservation system 240 via network 250. In response, travel metasearch website 220 receives travel-related data that satisfies the plurality of search parameters from both provider reservation system 230 and global reservation system 240. Using the travel-related data received from provider reservation system 230 and global reservation system 240, travel metasearch website 220 generates a metasearch result that is forwarded to client device 210.

While being capable of providing travel-related data to clients, travel metasearch website 220 is unable to directly provide clients with travel-related services. Any requests for travel-related services received by travel metasearch website 220 are redirected to systems that provide direct access to travel-related services, such as provider reservation system 230 and global reservation system 240. Using the previous example, the metasearch result forwarded to client device 210 may include a plurality of itineraries that satisfy the plurality of search parameters included in the search query. In response to the metasearch result, travel metasearch website 220 may receive a reservation request identifying one itinerary among the plurality of itineraries. Upon receiving the reservation request, travel metasearch website 220 may determine whether provider reservation system 230 or global reservation system 240 provided the travel-related data for the identified itinerary. Based on that determination, travel metasearch website 220 forwards the reservation request to provider reservation system 230 or global reservation system 240 for further processing. In forwarding the reservation request, no identifiers associated with client device 210 or client application 215 are propagated by travel metasearch website 220 to either provider reservation system 230 or global reservation system 240.

Provider reservation system 230 is a reservation system configured to provide customers with both travel-related data and travel-related services. Examples of systems suitable for implementing provider reservation system 230 are provided by Delta Air Lines, Incorporated of Atlanta, Ga., and American Airlines Group, Incorporated of Fort Worth, Tex. In contrast to travel metasearch website 220, the search results provided by provider reservation system 230 are based on travel-related data associated with a particular travel service provider. However, unlike travel metasearch website 220, provider reservation system 230 is able to directly provide clients with travel-related services offered by the particular travel service provider. In an embodiment, provider reservation system 230 may be implemented as a reservation system described below with respect to FIG. 3.

Global reservation system 240 is also a reservation system configured to provide customers with both travel-related data and travel-related services. An example of a system suitable for implementing global reservation system 240 is provided by Amadeus IT Group of Madrid, Spain. In contrast to provider reservation system 230, the search results provided by global reservation system 240 are based on travel-related data associated with multiple travel service providers. In contrast to travel metasearch website 220, global reservation system 240 is able to directly provide clients with travel-related services offered by multiple travel service providers. In an embodiment, global reservation system 240 may be implemented as a reservation system described below with respect to FIG. 3.

Figure 3:
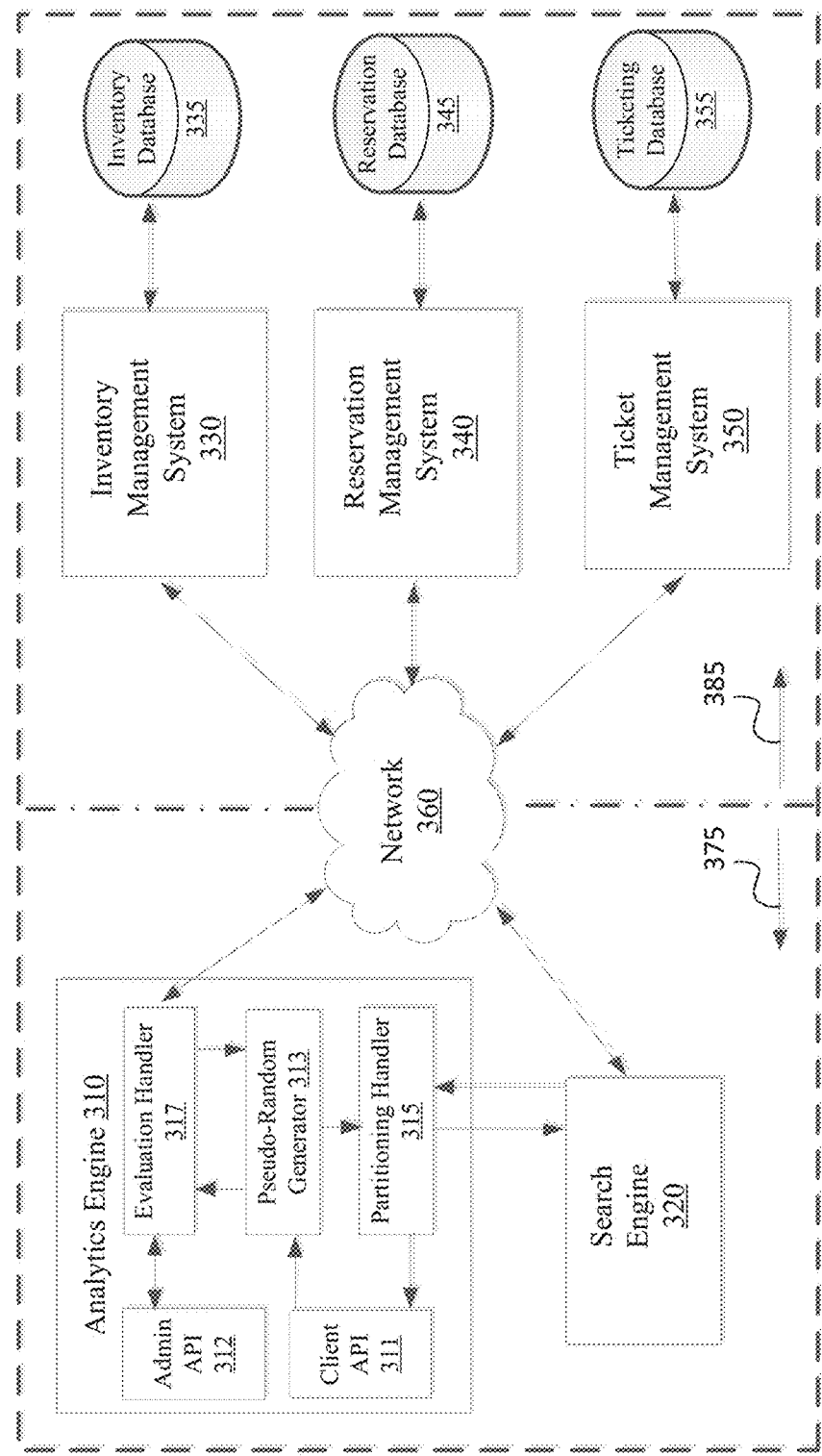
FIG. 3 is a block diagram of an example reservation system that is suitable for implementing aspects of the present invention.

FIG. 3 is a block diagram depicting an example reservation system 300 that is suitable for implementing aspects of the present invention. In an embodiment, reservation system 300 is implemented in provider reservation system 230 of FIG. 2. In an embodiment, reservation system is implemented in global reservation system 240. As depicted in FIG. 3, reservation system 300 includes front-end systems 375 and back-end systems 385 that exchange data via a network 360 composed of public and private networks, such as the Internet and a reservation system intranet. Front-end systems 375, such as analytics engine 310 and search engine 320, interact directly with clients, such as the combination of client device 210 and client application 215 of FIG. 2, during a travel reservation process. In contrast, clients of reservation system 300 are not exposed to back-end systems 385 that store the travel-related data and effectuate the travel-related services in reservation system 300, such as inventory management system 330, reservation management system 340, and ticket management system 350.

Analytics engine 310 is configured to facilitate client-agnostic partitioning of search queries using search parameter-based query identifiers and cross-session response tracking. An administrator of reservation system 300 (or other users having administrative access) may effectuate a controlled experiment in reservation system 300 by submitting an activation instruction to analytics engine 310 via admin API 312. In an embodiment, analytics engine 310 is configured to expose client API 311 to clients of reservation system 300 in response to receiving the activation instruction. In an embodiment, upon exposing client API 311 to clients, search queries submitted to reservation system 300 are directed to client API 311 instead of directly to an API associated with search engine 320. In an embodiment, in response to receiving a search query, client API 311 invokes pseudo-random generator 313 by forwarding the received search query to pseudo-random generator 313. In an embodiment, search queries submitted to reservation system 300 are directed to an API associated with search engine 320 instead of directly to client API 311. In an embodiment, analytics engine 310 is configured to expose client API 311 to search engine 320 in response to receiving an activation instruction. In an embodiment, upon exposing client API 311 to search engine 320, search queries submitted to search engine 320 are forwarded to analytics engine 310 via client API 311.

When invoked by client API 311, pseudo-random generator 313 is configured to parse the search query to extract search parameters from a plurality of search parameters included in the search query in accordance with predefined partitioning rules. The query identifier and the search query are forwarded by pseudo-random generator 313 to partitioning handler 315.

In an embodiment, the predefined partitioning rules are retrieved by pseudo-random generator 313 from a storage device accessible to analytics engine 310. In an embodiment, the predefined partitioning rules are included in the activation instruction. Pseudo-random generator 313 injects the extracted search parameters into a randomization function to generate a query identifier for the search query. In an embodiment, generating a query identifier includes performing a concatenation operation that joins the extracted search parameters in a specified order to form a concatenated parameter. In an embodiment, generating a query identifier includes computing a hash value for the search query using a concatenated parameter. In an embodiment, generating a query identifier includes applying a boost::hash_combine function sequentially on each extracted search parameter starting from a given seed.

In an embodiment, the extracted search parameters include a sub-set of the plurality of search parameters included in the search query. In an embodiment, the extracted search parameters are the plurality of search parameters included in the search query. In an embodiment, the randomization function is a hash function. In an embodiment, the randomization function is any ergodic function.

Partitioning handler 315 is configured to interact with search engine 320 to select one version of a search result that satisfies the plurality of search parameters from among a plurality of versions of the search result based on the query identifier. Each version of the search result among the plurality of versions of the search result is distinct from the other versions of the search result by virtue of a variant. Partitioning handler 315 forwards the selected version of the search result to client API to send to the client that submitted the search query.

In an embodiment, the query identifier is a hash value that is uniformly distributed on a range of hash values. In an embodiment, the range of hash values are partitioned into a plurality of partitions with each version of the search result among the plurality of versions of the search result is represented by one partition among the plurality of partitions. In an embodiment, partitioning handler 315 is configured to cache versioning data that associates a query identifier generated for a search query with a selected version of a search result sent to a client device in a storage device associated with reservation system 300. In an embodiment, an activation instruction includes a predefined selection ratio that specifies how search queries are to be partitioned among the various versions of the search result. In an embodiment, a current selection ratio indicating an actual partitioning of search queries may be determined based on the versioning data. In an embodiment, the current selection ratio is used to confirm that analytics engine 310 is adhering to the predefined selection ratio. In an embodiment, each variant associated with a particular version of the search result is defined by the predefined partitioning rules. In an embodiment, the plurality of versions of the search result are available in a storage device accessible to analytics engine 310 prior to receiving the search query. In an embodiment, based on the query identifier, the partitioning handler 315 is further configured to introduce a variant into a search result received from search engine. In an embodiment, based on the query identifier, the partitioning handler 315 is further configured to refrain from introducing a variant into a search result received from search engine.

Inventory-related data for one or more travel service providers is stored in inventory database 335 under the control of inventory management system 330. In an embodiment, inventory-related data includes availability information that defines unreserved travel services inventory. As used herein, "unreserved travel services inventory" relates to portions of a travel services inventory that are not associated with any reservation records stored in reservation database 345. In contrast, "reserved travel services inventory" relates to portions of a travel services inventory that are associated with one or more reservation records stored in reservation database 345. In an embodiment, inventory-related data includes fare information associated with the unreserved travel services inventory.

Reservation records for one or more travel service providers are stored in reservation database 345 under the control of reservation management system 340. Reservation management system 340 is configured to interact with search engine 320 to process reservation requests received during a reservation phase of a travel reservation process. In response to receiving a reservation request including a travel itinerary, reservation management system 340 generates a reservation record in reservation database 345. In an embodiment, the reservation record is a PNR. The reservation record includes itinerary data and a record locator that uniquely identifies the reservation record in reservation database 345. The record locator may also be referred to as a confirmation number, reservation number, confirmation code, booking reference, and the like.

Itinerary data generally includes travel information defining various travel services included in an itinerary and passenger information related to one or more passengers associated with the reservation record. Examples of travel information include: an origin location, a destination location, a departure date, a return date, a number in party, a point of sale, an RFISC, a booking class, a number of stops, a flight number, a travel provider identifier, a cabin, and the like. Examples of passenger information, for each passenger among the one or more passengers associated with a reservation record, include: name, gender, date of birth, citizenship, home address, work address, passport information, and the like.

One may recognize by comparing these examples of travel information with the examples of search parameters discussed above with respect to client application 215 of FIG. 2 that common data points exist between search queries and reservation records. These common data points are utilized by evaluation handler 317 of analytics engine 310 to correlate reservation records with particular versions of a search result previously sent to a client without utilizing any client identifiers. Specifically, evaluation handler 317 interacts with reservation management system 340 via network 360 to retrieve reservation records stored in reservation database 345. Evaluation handler 317 passes each reservation record received from reservation management system 340 to pseudo-random generator 313.

Pseudo-random generator 313 is configured to parse a reservation record to extract search parameter-related data from the travel information included in the reservation record in accordance with predefined partitioning rules. Pseudo-random generator 313 injects the extracted search parameter-related data into a randomization function to determine a query identifier associated with the reservation record. In an embodiment, a randomization function used to determine a partition identifier associated with a reservation record is the same randomization function used to generate a query identifier for a search query. The query identifier is forwarded by pseudo-random generator 313 to evaluation handler 317 for further processing. Comparing that query identifier with the predefined partitioning rules used to select search result versions for search queries enables evaluation handler 317 to correlate the reservation record with one version of the search result among the plurality of versions of the search result.

By correlating reservation records with particular versions of a search result previously sent to a client, evaluation handler 317 is able to compile evaluation data. Based on the evaluation data, evaluation handler 317 determines an evaluation metric, such as a conversion rate, for each version of the search result among the plurality of versions of the search result.

In generating the reservation record, reservation management system 340 submits a request to inventory management system 330 to update inventory database 335 accordingly. To update inventory database 335, any travel services included in the itinerary are associated with the record locator and transitioned from unreserved travel services inventory to reserved travel services inventory. Upon updating inventory database 335, inventory management system 330 may transmit a confirmation message to reservation management system 340. Responsive to receiving the confirmation message, reservation management system 340 may forward the record locator to a client device that sent the reservation request to confirm the itinerary is reserved. In an embodiment, reservation management system 340 forwards the record locator to the client device via search engine 320.

Ticket records for one or more travel service providers are stored in ticketing database 355 under the control of ticket management system 350. Ticket management system 350 is configured to interact with search engine 320, inventory management system 330, and reservation management system 340 to process ticket issuance requests received during a ticketing phase of a travel reservation process. During the ticketing phase, a ticket issuance request identifying a record locator corresponding to a reserved itinerary is received by ticket management system 350. In general, a ticket issuance request is triggered once payment is received for a reserved itinerary. In an embodiment, the ticket issuance request is received by ticket management system 350 via search engine 320.

Upon receiving the ticket issuance request, ticket management system 350 transmits the record locator to reservation management system 340. In response to the record locator, ticket management system 350 receives a reservation record associated with the record locator from reservation management system 340. Ticket management system 350 generates a ticket record in ticketing database 355 for each travel service segment and each passenger associated with the reserved travel itinerary using travel information and passenger information in the reservation record.

For example, a reservation record may include passenger information related to two passengers. The reservation record may further include travel information defining two airline flight segments for travel from an origin location to a destination location via a layover location and one airline flight segment for travel from the destination location to the origin location. In this example, the travel information defines three total airline flight segments for two passengers. In response to receiving a ticket issuance request associated the reservation record in this example, ticket management system 350 would generate six ticket records in ticketing database 355. Ticket management system 350 would submit a request to reservation management system 340 to update the reservation record stored in reservation database 345 to include six ticket numbers that identify each ticket record generated. That is, in this example, a single reservation record stored in reservation database 345 would include ticket numbers identifying six ticket records stored in ticketing database 355.

Figure 4:
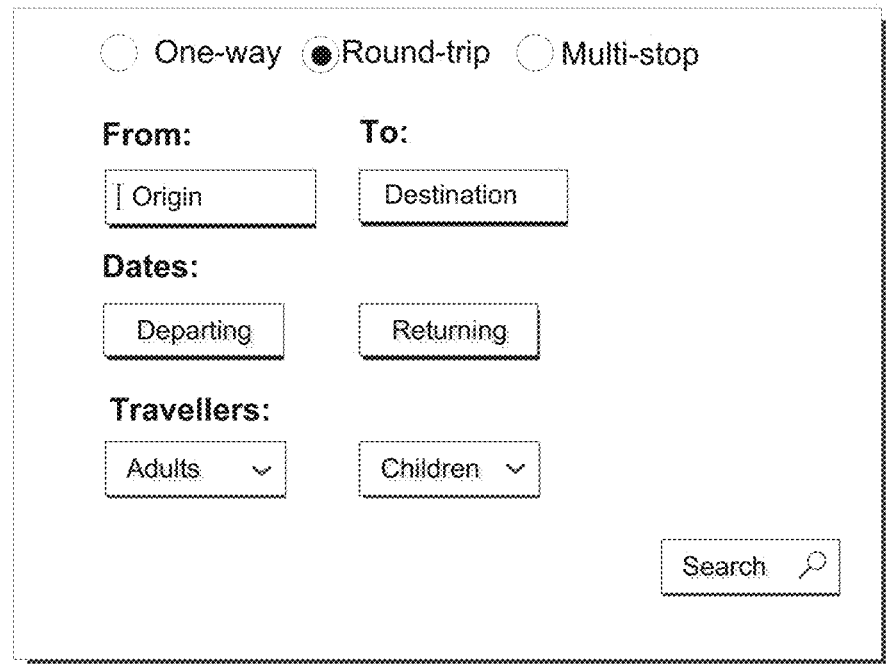
FIG. 4 is an example of an interface having a search input area configured to receive input data for generating a search query.

FIG. 4 illustrates an example of an interface 400 having a search input area configured to receive input data for generating a search query. Interface 400 may be presented by a client application executing on a client device (e.g., client application 215 and client device 210 of FIG. 2, respectively) during a search phase of a travel reservation process using data received from a search engine (e.g., search engine 320 of FIG. 3). Input data received via interface 400 may be used by the client device to determine search parameters for a search query.

Figure 5:
FIG. 5 is an example of an interface displaying a search result.

FIG. 5 illustrates an example of an interface 500 displaying a search result received in response to a search query. Interface 500 may be presented by a client application executing on a client device in response to using data received from a search engine in response to a search query. The search result displayed in interface 500 includes two itineraries that the search engine identified as satisfying a plurality of search parameters included in the search query. Each itinerary includes travel-related data, such as travel service availability data and travel service fare data. A "Reserve" interaction element is also provided on interface 500 next to each itinerary to enable the client to submit a reservation request for the corresponding itinerary. In an embodiment, the search result displayed on interface 500 corresponds to an instance where a partitioning handler associated with a search engine (e.g., partitioning handler 315 of FIG. 3) refrained from introducing a variant into the search result.

Figure 6:
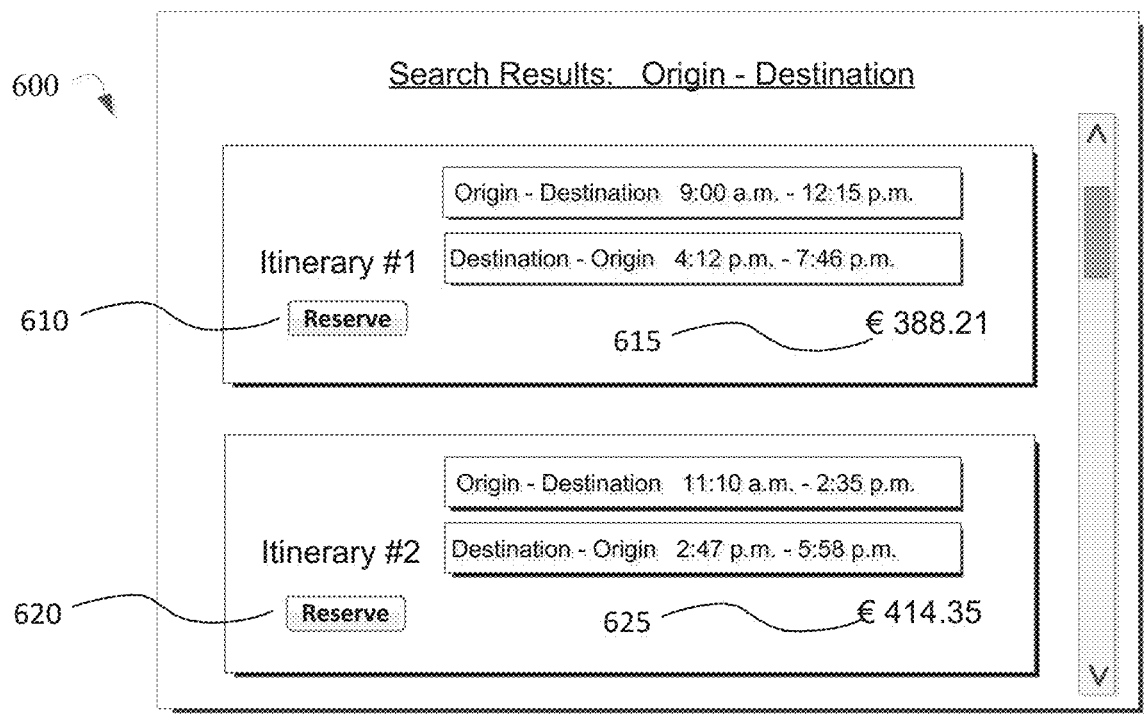
FIG. 6 is an example of an interface displaying a search result that is distinct from the search result displayed by the interface of FIG. 5 by virtue of an embodiment.
Figure 7:
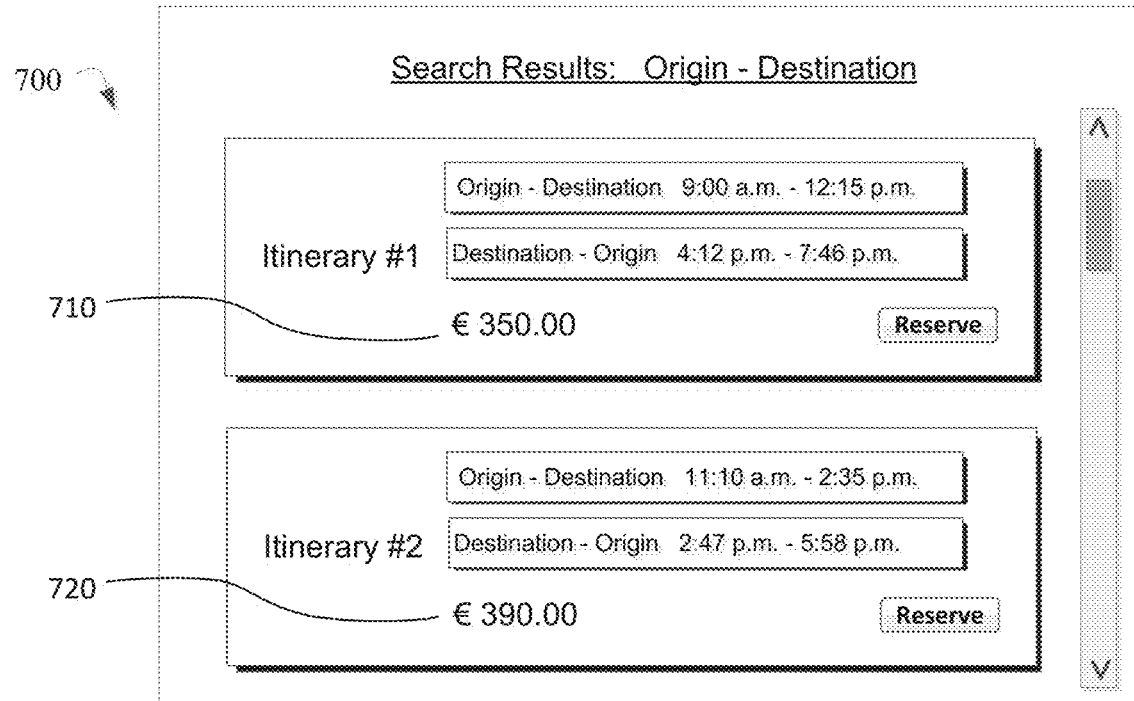
FIG. 7 is another example of an interface displaying a search result that is distinct from the search result displayed by the interface of FIG. 5 by virtue of an embodiment.

FIGS. 6-9 illustrate interfaces similar to interface 500 of FIG. 5 in which the partitioning handler introduced a variant into the search result. For example, FIG. 6 illustrates an interface 600 displaying a version of the search result that is distinct from other versions of the search result by virtue of an arrangement of interface elements. Specifically, a position of interface elements 610 and 620 relative to travel-related data elements 615 and 625, respectively, have been switched in comparison to interface 500 of FIG. 5. As another example, FIG. 7 illustrates an interface 700 displaying a version of the search result that is distinct from other versions of the search result by virtue of the price points associated with the two itineraries. Specifically, the price points associated with Itinerary #1 and Itinerary #2 represented by travel-related data elements 710 and 720, respectively, have been decreased in comparison to interface 500 of FIG. 5.

Figure 8:
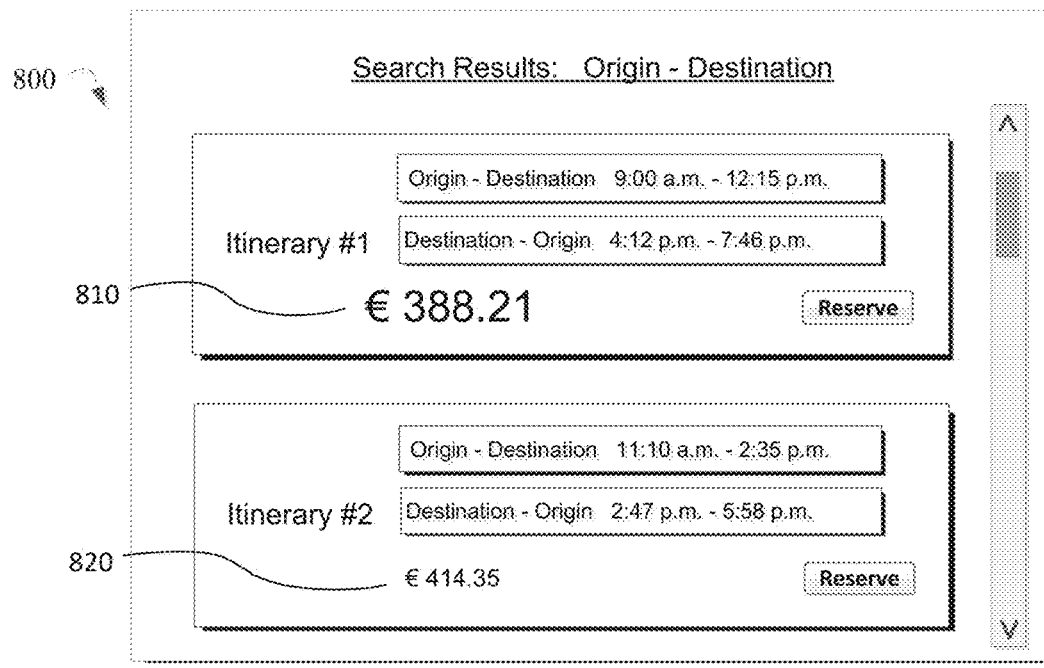
FIG. 8 is another example of an interface displaying a search result that is distinct from the search result displayed by the interface of FIG. 5 by virtue of an embodiment.
Figure 9:
FIG. 9 is another example of an interface displaying a search result that is distinct from the search result displayed by the interface of FIG. 5 by virtue of an embodiment.

FIG. 8 illustrates another example of an interface 800 displaying a version of the search result that is distinct from other versions of the search result by virtue of a visual element associated with the search result. Specifically, a font size associated with travel-related data elements 810 and 820 have been increased and decreased, respectively, in comparison to interface 500 of FIG. 5. As another example, FIG. 9 illustrates an interface 900 displaying a version of the search result that is distinct from other versions of the search result by virtue of having an additional interface element. Specifically, a hyper-link corresponding to web-site providing details of a special offer associated with Itinerary #1 represented by interface element 910 has been added to interface 900, which was not present in interface 500 of FIG. 5.

FIG. 10 depicts an embodiment of a method 1000 for client-agnostic partitioning of search queries using search parameter-based query identifiers in a distributed computing environment. In an embodiment, method 1000 may be effectuated by reservation system 300 of FIG. 3, as it generates a query identifier for a received search query. At block 1002, a search query including a plurality of search parameters is received. In an embodiment, block 1002 may be effectuated by partitioning handler 315 of FIG. 3. In an embodiment, the search request is an API call directed to an API of a reservation system. In an embodiment, the API call invokes a randomization function of the reservation system that generates a query identifiers. In an embodiment, the plurality of search parameters correspond to a travel request for a customer. In an embodiment, the request is received from a client device. In an embodiment, the request is received from a web client. In an embodiment, the plurality of search parameters include a flight number, a departure date, an arrival date, a point of origin, a destination, a number of stops, a booking class, a point of sale, a number in party, a RFSIC, or a combination thereof.

At block 1004, a query identifier is generated for the search query based on the plurality of search parameters. In an embodiment, block 1004 may be effectuated by pseudo-random generator 313 of FIG. 3. In an embodiment, the query identifier is generated by applying a hash function to the plurality of search parameters of the search query. In an embodiment, the query identifier is a hash value that is uniformly distributed on a range of hash values. In an embodiment, the range of hash values is partitioned into a plurality of partitions with each version of a search result being represented by one partition among the plurality of partitions. In an embodiment, the query identifier is generated by applying any ergodic function to the plurality of search parameters in the search query. In an embodiment, data is cached in a storage device associated with a reservation system that associates a query identifier with a selected version of a search result sent to a client device.

At block 1006, one version of a search result among a plurality of versions of the search result is selected based on the query identifier. Each version among the plurality of versions of the search result is distinct from other versions of the search result by virtue of a variant. In an embodiment, the variant includes a price point of a travel itinerary, a visual element associated with a search result, an interface element associated with a search result, an arrangement of interface elements associated with a search result, or a combination thereof. At block 1008, the selected version of the search result is sent to a client in response to the search query. In an embodiment, block 1006 and block 1008 may be effectuated by partitioning handler 315 of FIG. 3. In an embodiment, the client is a client device. In an embodiment, the client is a web-client.

FIG. 11 depicts an embodiment of a method 1100 for client-agnostic cross-session response tracking using search parameter-based query identifiers in a distributed computing environment. In an embodiment, method 1100 may be effectuated by reservation system 300 of FIG. 3, as it correlates a record in a reservation database with a selected version of the search result among a plurality of versions using a query identifier. At block 1102, a record is received that was generated in a reservation database responsive to a booking of a travel itinerary included in a search response. In an embodiment, block 1102 may be effectuated by evaluation handler 317 of FIG. 3.

At block 1104, the record is analyzed to identify a plurality of search parameters included in a search query that prompted the search response. In an embodiment, the plurality of search parameters are identified in predefined partitioning rules received in an activation instruction. At block 1106, a query identifier associated with the record is generated based on the plurality of search parameters. In an embodiment, the query identifier is generated using the same randomization function that was used to generate a query identifier for the search query. In an embodiment, block 1104 and block 1106 may be implemented using pseudo-random generator 313 of FIG. 3. At block 1108, the record is correlated with one version of a search result among a plurality of versions of the search result based on the query identifier.

Figure 12:
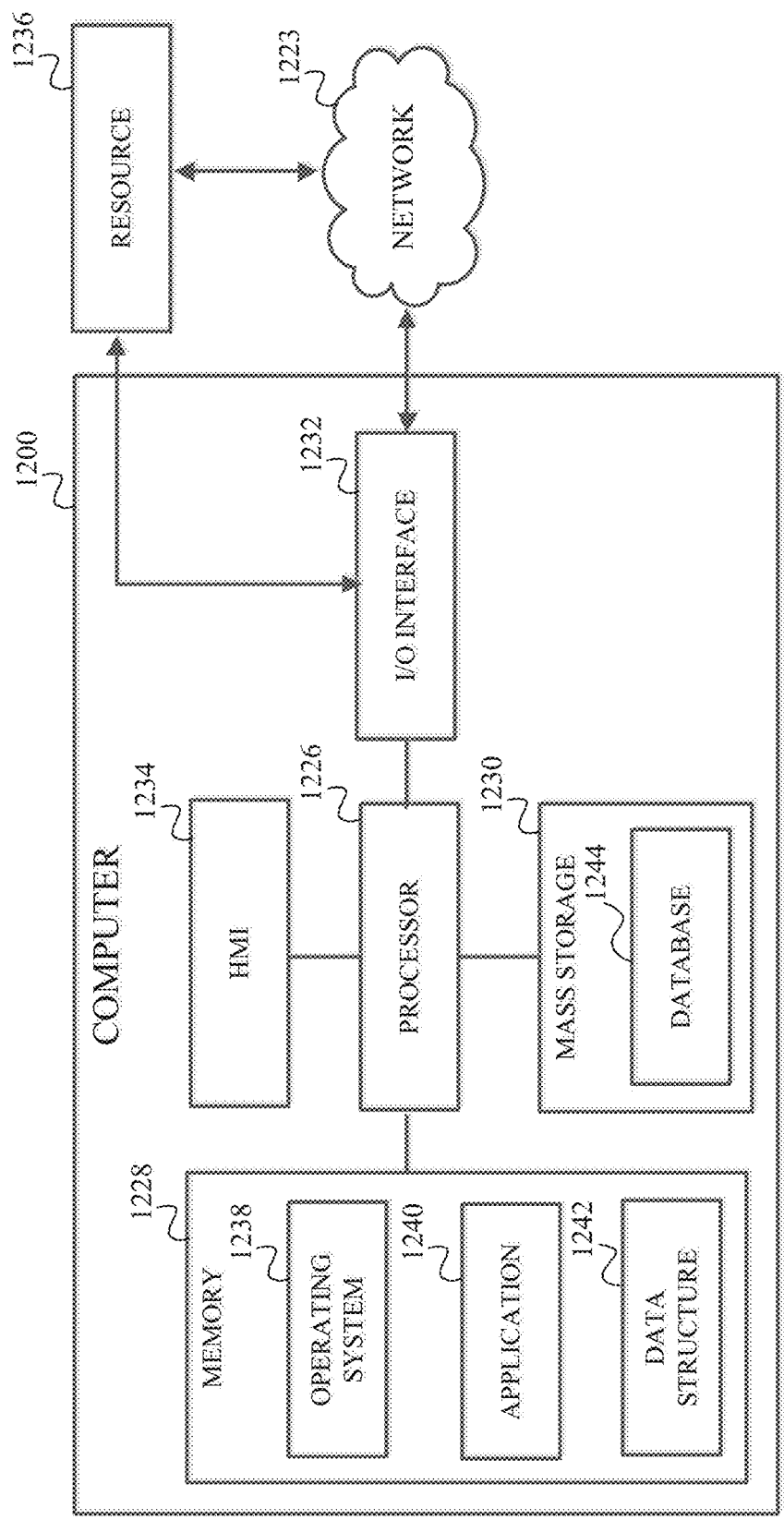
FIG. 12 is a block diagram of an example computing environment suitable for use in implementing embodiments of the invention.

Having described various embodiments of the invention, an exemplary computing environment suitable for implementing embodiments of the invention is now described. With reference to FIG. 12, client device 210, travel metasearch website 220, provider reservation system 230, global reservation system 240, reservation system 300, analytics engine 310, search engine 320, inventory management system 330, reservation management system 340, and ticket management system 350 may be implemented on one or more computer devices or systems, such as exemplary computer system 1200. The computer system 1200 may include a processor 1226, a memory 1228, a mass storage memory device 1230, an input/output (I/O) interface 1232, and a Human Machine Interface (HMI) 1234. The computer system 1200 may also be operatively coupled to one or more external resources 1236 via the network 1223 or I/O interface 1232. External resources may include, but are not limited to, servers, databases, mass storage devices, peripheral devices, cloud-based network services, or any other suitable computer resource that may be used by the computer system 1200.

The processor 1226 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1228. The memory 1228 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 1230 may include data storage devices such as a hard drive, optical drive, tape drive, non-volatile solid state device, or any other device capable of storing information.

The processor 1226 may operate under the control of an operating system 1238 that resides in the memory 1228. The operating system 1238 may manage computer resources so that computer program code embodied as one or more computer software applications, such as an application 1240 residing in memory 1228, may have instructions executed by the processor 1226. In an alternative embodiment, the processor 1226 may execute the application 1240 directly, in which case the operating system 1238 may be omitted. One or more data structures 1242 may also reside in memory 1228, and may be used by the processor 1226, operating system 1238, or application 1240 to store or manipulate data.

The I/O interface 1232 may provide a machine interface that operatively couples the processor 1226 to other devices and systems, such as the network 1223 or the one or more external resources 1236. The application 1240 may thereby work cooperatively with the network 1223 or the external resources 1236 by communicating via the I/O interface 1232 to provide the various features, functions, applications, processes, or modules comprising embodiments of the invention. The application 1240 may also have program code that is executed by the one or more external resources 1236, or otherwise rely on functions or signals provided by other system or network components external to the computer system 1200. Indeed, given the nearly endless hardware and software configurations possible, persons having ordinary skill in the art will understand that embodiments of the invention may include applications that are located externally to the computer system 1200, distributed among multiple computers or other external resources 1236, or provided by computing resources (hardware and software) that are provided as a service over the network 1223, such as a cloud computing service.

The HMI 1234 may be operatively coupled to the processor 1226 of computer system 1200 in a known manner to allow a user to interact directly with the computer system 1200. The HMI 1234 may include video or alphanumeric displays, a touch screen, a speaker, and any other suitable audio and visual indicators capable of providing data to the user. The HMI 1234 may also include input devices and controls such as an alphanumeric keyboard, a pointing device, keypads, pushbuttons, control knobs, microphones, etc., capable of accepting commands or input from the user and transmitting the entered input to the processor 1226.

A database 1244 may reside on the mass storage memory device 1230, and may be used to collect and organize data used by the various systems and modules described herein. Inventory database 335, reservation database 345, and ticket database 355 may be implementing using one or more databases, such as database 1244. The database 1244 may include data and supporting data structures that store and organize the data. In particular, the database 1244 may be arranged with any database organization or structure including, but not limited to, a relational database, a hierarchical database, a network database, or combinations thereof. A database management system in the form of a computer software application executing as instructions on the processor 1226 may be used to access the information or data stored in records of the database 1244 in response to a query, where a query may be dynamically determined and executed by the operating system 1238, other applications 1240, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed:

1. A system comprising:
a computing device; and
a computer-readable storage medium comprising a set of instructions that upon execution by the computing device cause the system to:
receive, at a reservation system, a search query corresponding to a travel request for a customer from a client device, the search query including a plurality of search parameters determined locally at the client device using input data received via an interface on the client device;
generate, by the reservation system, a query identifier for the search query based on the plurality of search parameters;
determine, by the reservation system and based on the query identifier, a search result comprising a travel itinerary that satisfies the plurality of search parameters;
determine, by the reservation system, a variant based on the search result;
compare the query identifier with predefined partitioning rules for partitioning users to select one version of the search result among a plurality of versions of the search result based on the query identifier, wherein a version corresponds to an update or a new feature affecting a display of the search result on the client device and wherein each version of the search result is distinct from other versions of the search result by virtue of the variant; and
send the selected version of the search result to the client device, the selected version of the search result updating the interface on the client device, wherein a presentation of the interface on the client device comprises visual elements associated with the selected version of the search result that are distinct from the other versions of the search result.

2. The system of claim 1, wherein the set of instructions that upon execution by the computing device further cause the system to:

correlate a record in a reservation database with the selected version of the search result sent to the client device based on the query identifier, the record generated in the reservation database responsive to a booking of the travel itinerary.

3. The system of claim 1, wherein the search query is an application program interface (API) call directed to an API of the reservation system.

4. The system of claim 3, wherein the API call invokes a randomization function of the reservation system that generates the query identifier.

5. The system of claim 4, wherein the randomization function is a hash function.

6. The system of claim 1, wherein the set of instructions that upon execution by the computing device further cause the system to:

determine an evaluation metric for each version of the search result among the plurality of versions of the search result.

7. The system of claim 1, wherein the set of instructions that upon execution by the computing device further cause the system to:

measure a current selection ratio between each version of the search result among the plurality of versions of the search result; and compare the current selection ratio to a predefined selection ratio.

8. The system of claim 1, wherein no identifiers associated with the client device or a client application on the client device that generated the search query are propagated to the reservation system with the received search query.

9. A method comprising:

receiving, at a reservation system, a search query corresponding to a travel request for a customer from a client device, the search query including a plurality of search parameters determined locally at the client device using input data received via an interface on the client device;

generating, by the reservation system, a query identifier for the search query based on the plurality of search parameters;

determining, by the reservation system and based on the query identifier, a search result comprising a travel itinerary that satisfies the plurality of search parameters;

determine, by the reservation system, a variant based on the search result;

comparing the query identifier with predefined partitioning rules for partitioning users to select one version of the search result among a plurality of versions of the search result based on the query identifier, wherein a version corresponds to an update or a new feature affecting a display of the search result on the client device and wherein each version of the search result is distinct from other versions of the search result by virtue of the variant; and sending the selected version of the search result to the client device, the selected version of the search result updating the interface on the client device, wherein a presentation of the interface on the client device comprises visual elements associated with the selected version of the search result that are distinct from the other versions of the search result.

10. The method of claim 9, further comprising: determining an evaluation metric for each version of the search result among the plurality of versions of the search result.

11. The method of claim 10, wherein the evaluation metric is a conversion rate indicative of a percentage of travel itinerary bookings associated with each version of the search result.

12. The method of claim 9, wherein generating the query identifier further comprises: applying a hash function to the plurality of search parameters in the search query.

13. The method of claim 12, wherein the query identifier is a hash value that is uniformly distributed on a range of hash values, and the range of hash values is partitioned, based on the predefined partitioning rules, into a plurality of partitions with each version of the search result being represented by one partition among the plurality of partitions.

14. The method of claim 12, further comprising:

correlating a record in a reservation database with the selected version of the search result sent to the client device based on the query identifier, the record generated in the reservation database responsive to a booking of the travel itinerary; and applying the hash function to data in the record that corresponds to the plurality of search parameters.

15. The method of claim 9, further comprising:

caching versioning data that associates the query identifier with the selected version of the search result sent to the client device in a storage device associated with the reservation system.

16. The method of claim 15, further comprising:

determining a current selection ratio using the versioning data; and confirming adherence to a predefined selection ratio with the current selection ratio.

17. The method of claim 9, wherein the plurality of search parameters include a flight number, a departure date, an arrival date, a point of origin, a destination, a number of stops, a booking class, a point of sale, a number in party, a reason for issuance sub-code, or a combination thereof.

18. The method of claim 9, wherein the variant includes a price point of the travel itinerary, a visual element associated with the search result, an interface element associated with the search result, an arrangement of interface elements associated with the search result, or a combination thereof.

19. A non-transitory computer-readable storage medium comprising computer-readable instructions that upon execution by a processor of a computing device cause the computing device to:

receive, at a reservation system, a search query corresponding to a travel request for a customer from a client device, the search query including a plurality of search parameters determined locally at the client device using input data received via an interface on the client device;

generate, by the reservation system, a query identifier for the search query based on the plurality of search parameters;

determine, by the reservation system and based on the query identifier, a search result comprising a travel itinerary that satisfies the plurality of search parameters;

determine, by the reservation system, a variant based on the search result;

compare the query identifier with predefined partitioning rules for partitioning users to select one version of the search result among a plurality of versions of the search result based on the query identifier, wherein a version corresponds to an update or a new feature affecting a display of the search result on the client device and wherein each version of the search result is distinct from other versions of the search result by virtue of the variant; and send the selected version of the search result to the client device, the selected version of the search result updating the interface on the client device, wherein a presentation of the interface on the client device comprises visual elements associated with the selected version of the search result that are distinct from the other versions of the search result.

20. The computer-readable storage medium of claim 19, wherein each version of the search result among the plurality of versions of the search result directs a web browser of the client device to a different version of a search results page.

21. The computer-readable storage medium of claim 19, wherein the computer-readable instructions that upon execution by the processor further cause the computing device to:

determine an evaluation metric for each version of the search result among the plurality of versions of the search result based in part on correlating a record in a reservation database with the selected version of the search result sent to a web client based on the query identifier, the record generated in the reservation database responsive to a booking of the travel itinerary.

\* \* \* \* \*